(12) United States Patent
Cheng

(10) Patent No.: US 6,478,503 B1
(45) Date of Patent: Nov. 12, 2002

(54) LOCKING DEVICE FOR A DETACHABLE HANDREST OF A STROLLER

(75) Inventor: Ying-Hsiung Cheng, Tainan Hsien (TW)

(73) Assignee: Pao-Hsien Cheng, Tainan Hsien (TW)

( * ) Notice: Subject to any disclaimer, the term of this patent is extended or adjusted under 35 U.S.C. 154(b) by 0 days.

(21) Appl. No.: 09/888,551

(22) Filed: Jun. 26, 2001

(51) Int. Cl.⁷ ................................................ F16B 21/00
(52) U.S. Cl. .................... 403/322.4; 403/327; 403/330; 280/642; 280/47.38
(58) Field of Search .............................. 403/322.1, 305, 403/321, 322.3, 322.4, 325, 327, 330, 360; 280/642, 47.38; 297/256.15, 488

(56) References Cited

U.S. PATENT DOCUMENTS

| | | | | |
|---|---|---|---|---|
| 1,851,843 A | * | 3/1932 | Inman | 403/327 X |
| 2,614,781 A | * | 10/1952 | Engel | 403/330 X |
| 4,586,399 A | * | 5/1986 | Kassai | 403/330 X |
| 4,679,806 A | * | 7/1987 | Gingline | 280/47.38 |
| 4,867,595 A | * | 9/1989 | Hoffman | 403/330 X |
| 5,004,253 A | * | 4/1991 | Nakao et al. | 280/47.38 |
| 5,123,767 A | * | 6/1992 | Ishikura et al. | 280/47.38 X |
| 5,803,535 A | * | 9/1998 | Cabagnero | 297/488 X |
| 6,267,404 B1 | * | 7/2001 | Yang et al. | 280/642 |

* cited by examiner

Primary Examiner—Lynne H. Browne
Assistant Examiner—David E. Bochna
(74) Attorney, Agent, or Firm—Rosenberg, Klein & Lee

(57) ABSTRACT

A locking device for a handrest of a stroller includes two connecting tubes secured to the front of the stroller and two pairs of locking members. The pairs of locking members are movably received in a respective one of the tubes; the locking members have lower button parts passing through lateral holes of the tubes to show, and are pivoted to the tubes from middle portions with upper engaging portions being movably received in recesses of inner sides of the tubes. An elastic member is disposed between lower parts of each pair of locking members to bias the upper engaging portions towards the center of the tube. Thus, a handrest having engaging protrusions at two ends can be locked with the tubes by means of passing the engaging protrusions into the tube to engage the upper engaging portions of the locking members. The handrest becomes removable from the tubes when the lower button parts are pressed inwardly of the tubes to disengage the upper engaging portions from the engaging protrusions of the handrest.

5 Claims, 4 Drawing Sheets

LOCKING DEVICE FOR A DETACHABLE HANDREST OF A STROLLER

BACKGROUND OF THE INVENTION

The present invention relates to a locking device for a detachable handrest of a stroller, which can be operated very easily for the handrest to be removed so that the stroller can be folded to a compact size for storage and transportation.

Many strollers are provided with handrests at the fronts of the seats for preventing the babies sitting in them from falling out of the strollers from the fronts, and for the babies to rest its hands on.

Referring to FIG. 5, a handrest is fixedly connected to the support rod of a stroller for the above mentioned purposes. However, it is found to have a drawback that it can't be removed when the stroller is folded for storage and transportation, i.e. when the stroller is folded, the handrest still fitted to it will make it unable to be folded to an ideal size. And, the handrest is likely to cause inconvenience to the user when she doesn't need it in using the stroller.

SUMMARY OF THE INVENTION

Therefore, it is a main object of the present invention to provide a locking device for a handrest of a stroller so that the handrest can be removed and put back.

The handrest locking device of the present invention includes two connecting tubes, and two pairs of locking members. The connecting tubes are formed ate two ends of front portion of the stroller.

The pairs of the locking members are movably received in a respective one of the tubes. The locking members have lower button parts passing through lateral holes of the tubes to show, and are pivoted to the tubes from middle portions. The locking members further have upper engaging portions movably received in recesses of inner sides of the connecting tubes. An elastic member is disposed between lower parts of each pair of locking members to bias the upper engaging portions towards the center of the connecting tube.

Thus, a handrest having engaging protrusions at two ends can be locked with the tubes by means of passing the engaging protrusions into the tubes to engage the upper engaging portions of the locking members. The handrest becomes removable when the lower button parts are pressed inwardly of the tubes for the upper engaging portions to move towards edges of the receiving recesses to disengage the engaging protrusions of the handrest.

So, the handrest can be easily removed if need be, e.g. when the stroller needs to be folded to a compact size for storage and transportation.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
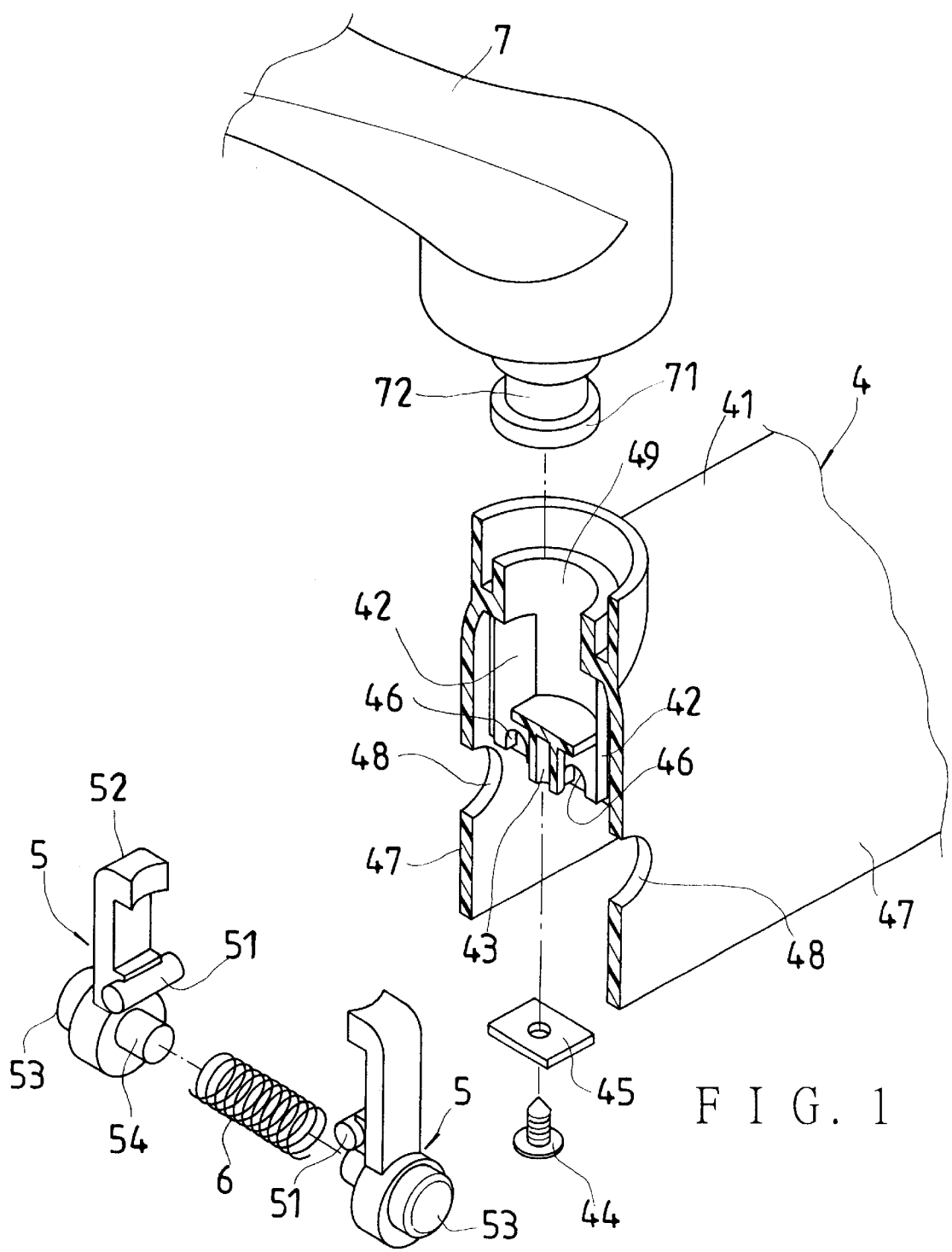
FIG. 1. is an exploded perspective view of the locking device for a stroller handrest according to the present invention.
Figure 3:
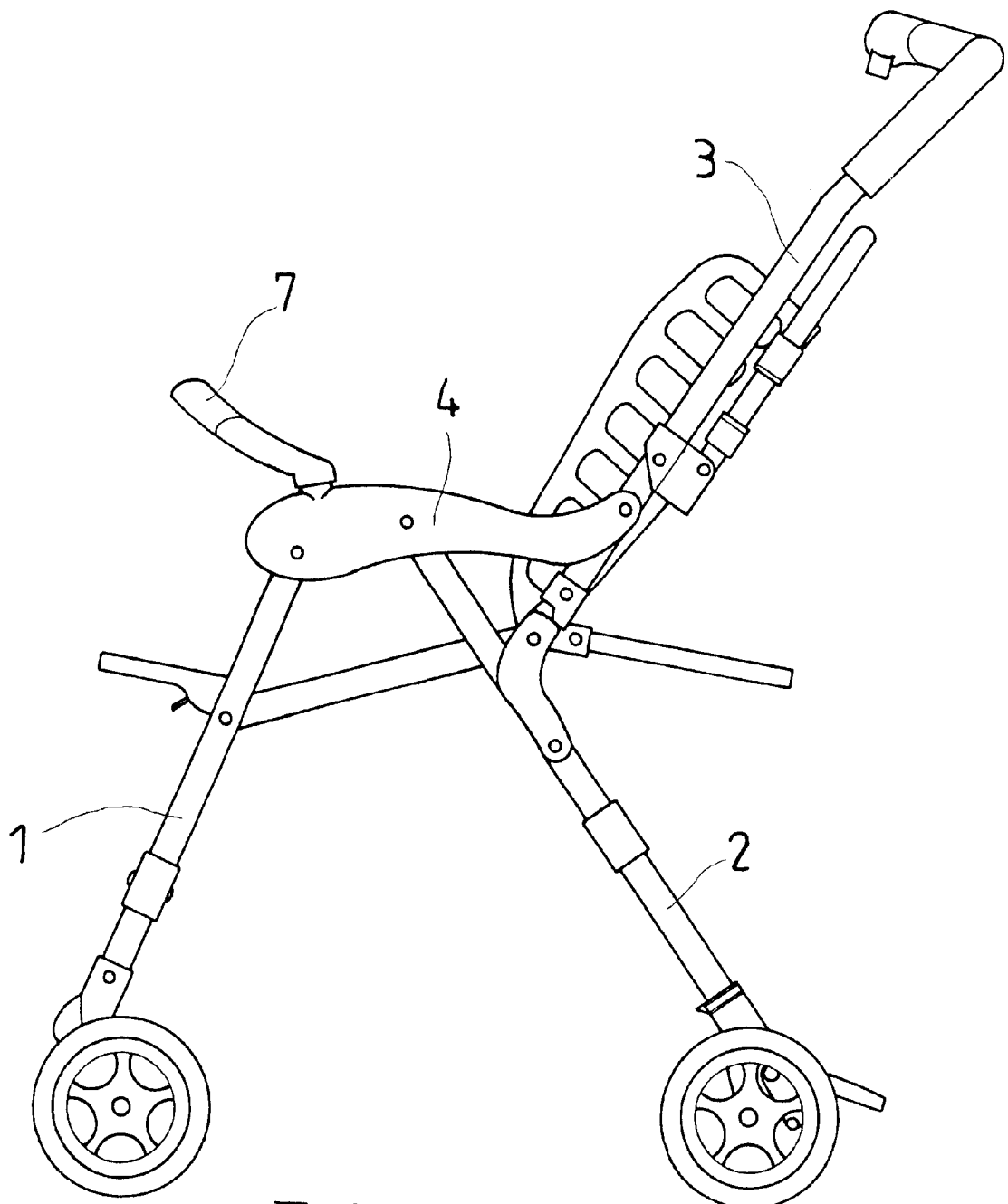
FIG. 3. is a side view of a stroller provided with the handrest and the locking device of the present invention.
Figure 5:
FIG. 5. is a perspective view of a stroller with a handrest fixedly connected to it.

Referring to FIGS. 1 and 3, a locking device for a detachable handrest of a stroller according to the present invention includes two connecting tubes 41, which are formed between front end portions of two lateral walls 47 of connecting members 4 of the stroller, and which each has two locking members 5 movably received therein. The connecting members 4 are each pivoted to a front support rod 1, a rear support rod 2 and a handle support rod 3 at one side of the stroller as shown in FIG. 3.

The handrest 7 has engaging protrusions 71 at two ends thereof each of the engaging protrusions 71 has an annular recess 72 on the upper end portion. The connecting tubes 41 each has two through holes 48 facing each other.

The connecting tubes 41 each has two receiving recesses 42, and a connecting part, which includes a screw hole 43, and two pivotal gaps 46 on two sides of the screw hole 43. The receiving recesses 42 are formed on the inner sides of the walls of the connecting tubes 41, facing each other. The connecting tubes 41 have stopping parts 49 on the upper ends of the receiving recesses 42.

The connecting part is formed at a middle of the connecting tube 41 so that the screw hole 43 of the connecting part is at the center of the tube 41.

The locking members 5 each has a pivotal part 51, an engaging end portion 52, a button part 53 and a positioning protrusion 54. The locking members 5 are disposed in the connecting tubes 41 with the button parts 53 being passed through a corresponding one of the through holes 48 on the lateral walls 47 to show, and with the positioning protrusions 54 in each of the connecting tubes 41 facing each other. The positioning protrusions 54 in each of the connecting tubes 41 are passed through two ends of an elastic member 6. The pivotal parts 51 are received in the pivotal gaps 46 of the middle connecting parts in the connecting tubes 41; a confining element 45 is fixedly connected to the middle connecting part by a screw 44 screwed into the screw hole 43 so that the pivotal parts 51 are confined in the pivotal gaps 46 by the confining element 45.

The parts of the locking members 5 above the pivotal parts 51 are movably received in the receiving recesses 42 of the connecting tubes 41 with the engaging end portions 52 being disposed under, and very close to, the stopping parts 49.

Figure 2:
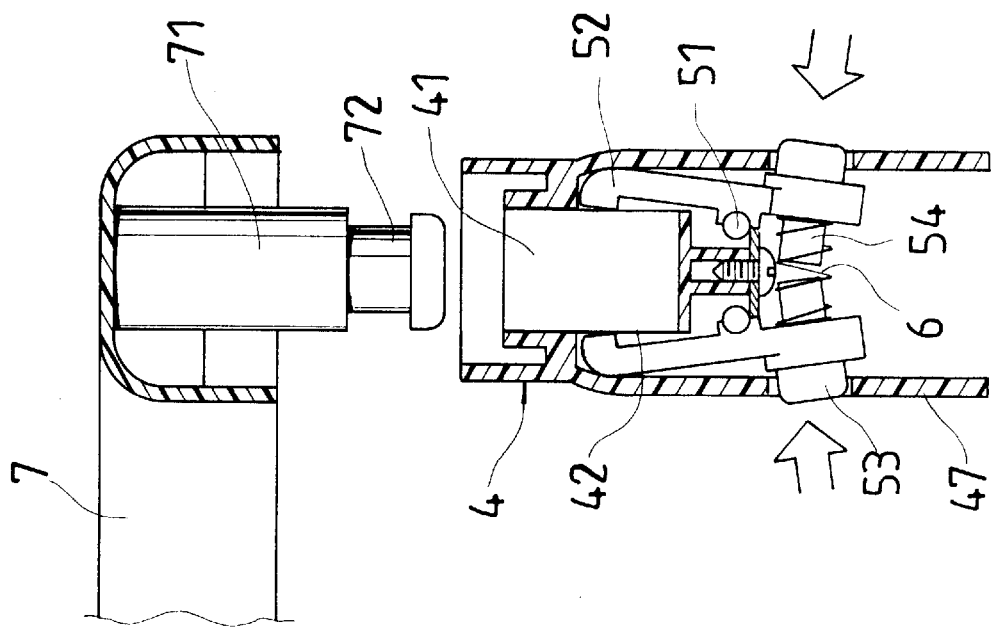
FIG. 2. is a cross-sectional view of the locking device of the present invention in a locking position.

Referring to FIG. 2, to lock the handrest 7 onto the connecting members 4 of the stroller, the engaging protrusions 71 are passed into a respective one of the upper portions of the connecting tubes 41; the button parts 53 of the locking members 5 can be pressed at the same time to move the engaging end portions 52 towards the edge of the connecting tubes 41 for permitting the engaging protrusions 71 to be easily inserted into between the engaging portions 52 After the engaging protrusions 71 are inserted into between the engaging end portions 52 and the pressure on the buttons 53 are removed, the elastic members 6 will pivot the locking members 5 on the pivotal gaps 46 for the engaging ends 52 to move towards the center of the connecting tubes 41 to pass onto the annular recesses 72 to engage the engaging protrusions 71 of the handrest 7. Thus, the handrest 7 is firmly attached to the connecting members 4 of the stroller. Furthermore, the stopping parts 49 can abut the engaging end portions 52 to stop the locking members 5 from moving up when the handrest 7 is lifted in the locking position, preventing the locking members 5 from getting damaged by sudden upward movement of the handrest 7.

Figure 4:
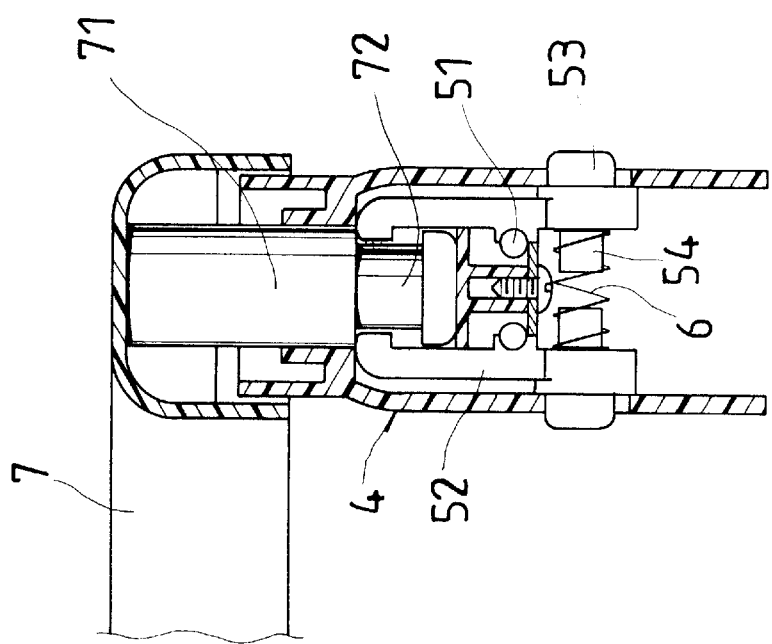
FIG. 4. is a cross-sectional view of the locking device of the present invention in the unlocking position.

Referring to FIG. 4, to make the handrest 7 become removable from the stroller, the button parts 53 are pressed for the engaging end portions 52 to disengage the engaging protrusions 71.

From the above description, the locking device for a handrest of a stroller of the present invention permits the handrest to be easily removed so that the stroller can be folded to an ideal compact size for saving the space of storage and the cost of transportation.

What is claimed is:

1. A locking device for a handrest of a stroller, comprising two connecting tubes fixedly disposed at a front portion of a stroller;

two pairs of locking members, each pair of said locking members being received in a respective one of said connecting tubes; said locking members having lower button parts passing through through holes of said connecting tubes with lower positioning protrusions on other sides of said button parts being received in said connecting tubes; said locking members being pivoted to connecting parts formed in said connecting tubes from middle portions with upper portions of said locking members being movably received in a respective one of receiving recesses on inner sides of said connecting tubes; said locking member upper portions having engaging end portions;

two elastic members, said elastic members being connected to lower inner sides of a respective pair of said locking members for biasing said lower button parts of said locking members outwardly of said connecting tubes, and biasing said top engaging end portions towards a center of a respective one of said connecting tubes to keep said locking members at a locking position;

whereby a handrest having engaging protrusions at two ends can be detachably locked with said connecting tubes by means of passing said engaging protrusions into said tubes to engage said top engaging end portions of said locking members; said handrest being capable of being removed from said tubes when said button parts of said locking members are pressed inwardly of said tubes for moving said top engaging end portions towards edges of said receiving recesses to disengage said engaging protrusions.

2. The locking device for a handrest of a stroller as claimed in claim 1, wherein said connecting tubes each have a screw hole formed in the bottom, the screw passes through a confining element and threaded into the connecting tube to stably position locking members by confining element.

3. The locking device for a handrest of a stroller as claimed in claim 1, wherein pivotal gaps are formed in two lateral walls of a bottom of said connecting tube for, for pivotal parts to pivot.

4. The locking device for a handrest of a stroller as claimed in claim 1, wherein said connecting tubes have a stopping part on an upper end of each of said receiving recesses to abut said top engaging end portions for stopping said locking members from moving up when said handrest is lifted under said locked position.

5. The locking device for a handrest of a stroller as claimed in claim 1, wherein said lower inner sides of said locking members each has a positioning protrusion sticking out therefrom, and said positioning protrusions are each passed into one of two ends of said elastic members.

* * * * *